United States Patent
Springer

(10) Patent No.: US 12,475,822 B2
(45) Date of Patent: Nov. 18, 2025

(54) CHANGING A DISPLAY INPUT CHANNEL BASED ON A FAIL STATE DETERMINATION

(71) Applicant: Zoom Communications, Inc., San Jose, CA (US)

(72) Inventor: Shane Paul Springer, Oregon City, OR (US)

(73) Assignee: Zoom Communications, Inc., San Jose, CA (US)

( * ) Notice: Subject to any disclaimer, the term of this patent is extended or adjusted under 35 U.S.C. 154(b) by 134 days.

(21) Appl. No.: 18/469,993

(22) Filed: Sep. 19, 2023

(65) Prior Publication Data

US 2024/0038111 A1    Feb. 1, 2024

Related U.S. Application Data

(63) Continuation of application No. 17/877,775, filed on Jul. 29, 2022, now Pat. No. 11,798,447.

(51) Int. Cl.
G09G 3/00    (2006.01)

(52) U.S. Cl.
CPC ....... *G09G 3/006* (2013.01); *G09G 2320/062* (2013.01)

(58) Field of Classification Search
CPC .......................... G09G 3/006; G09G 2320/062
See application file for complete search history.

(56) References Cited

U.S. PATENT DOCUMENTS

| | | | |
|---|---|---|---|
| 5,175,722 A | 12/1992 | Minami et al. | |
| 5,294,989 A * | 3/1994 | Moore | H04N 5/21 348/241 |
| 6,950,548 B1 * | 9/2005 | Bachelder | G06T 7/001 250/559.34 |
| 7,092,572 B2 * | 8/2006 | Huang | G06T 7/001 382/218 |
| 8,466,859 B1 | 6/2013 | Herz | |
| 2002/0157033 A1 * | 10/2002 | Cox | G09G 3/006 714/1 |

(Continued)

OTHER PUBLICATIONS

Using Screen Patterns, Imaste, <https://www.imatest.com/docs/screenpatterns/>, May 2022, 4 pages.

(Continued)

*Primary Examiner* — Akm Zakaria
(74) *Attorney, Agent, or Firm* — Young Basile Hanlon & MacFarlane, P.C.

(57) ABSTRACT

Illumination testing is performed to passively check the health of a display of a shared device within a physical space, such as a conference room. A test pattern is output to the display within the physical space. Using a camera within the physical space, a test image of the physical space is captured while the test pattern is output to the display. A determination is then made as to whether the display is in a fail state by comparing the test image against a reference image depicting an expected illumination of the physical space according to the test pattern. Where the device is determined to be in a fail state, a notification indicating the fail state is transmitted to an administrator device to alert an administrator associated therewith of the fail state.

20 Claims, 8 Drawing Sheets

(56) References Cited

U.S. PATENT DOCUMENTS

| | | | |
|---|---|---|---|
| 2004/0032280 A1* | 2/2004 | Clark | G01N 21/95 |
| | | | 324/750.14 |
| 2010/0188653 A1 | 7/2010 | McGarry et al. | |
| 2013/0155085 A1* | 6/2013 | Fergason | G09G 5/10 |
| | | | 345/545 |
| 2014/0119600 A1* | 5/2014 | Maruyama | H04N 23/63 |
| | | | 382/103 |
| 2016/0366369 A1* | 12/2016 | Balasaygun | H04N 7/147 |
| 2017/0094268 A1* | 3/2017 | Gulati | G09G 5/39 |
| 2017/0134723 A1* | 5/2017 | Mandel | G09G 3/006 |
| 2017/0357917 A1* | 12/2017 | Holmes | G06Q 10/109 |
| 2020/0251032 A1* | 8/2020 | Nakamura | G06F 11/2221 |
| 2020/0342668 A1* | 10/2020 | Chojnacka | G06V 20/20 |
| 2021/0281829 A1* | 9/2021 | Kimpe | H04N 23/695 |
| 2022/0006701 A1* | 1/2022 | Patel | H04L 41/122 |

OTHER PUBLICATIONS

Appearance-Based Visual Learning and Object Recognition with Illumination Invariance, Ohba et al., Dec. 2020, 10 pages.

* cited by examiner

CHANGING A DISPLAY INPUT CHANNEL BASED ON A FAIL STATE DETERMINATION

CROSS-REFERENCE TO RELATED APPLICATION(S)

This application is a continuation of U.S. application Ser. No. 17/877,775, filed Jul. 29, 2022, the entire disclosure of which is herein incorporated by reference.

FIELD

This disclosure generally relates to illumination testing for shared device displays, and, more specifically, to determining the health of a display of a shared device within a physical space based on a comparison between a test image captured while a test pattern is output to the display and a reference image depicting an expected illumination of the physical space according to the test pattern.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
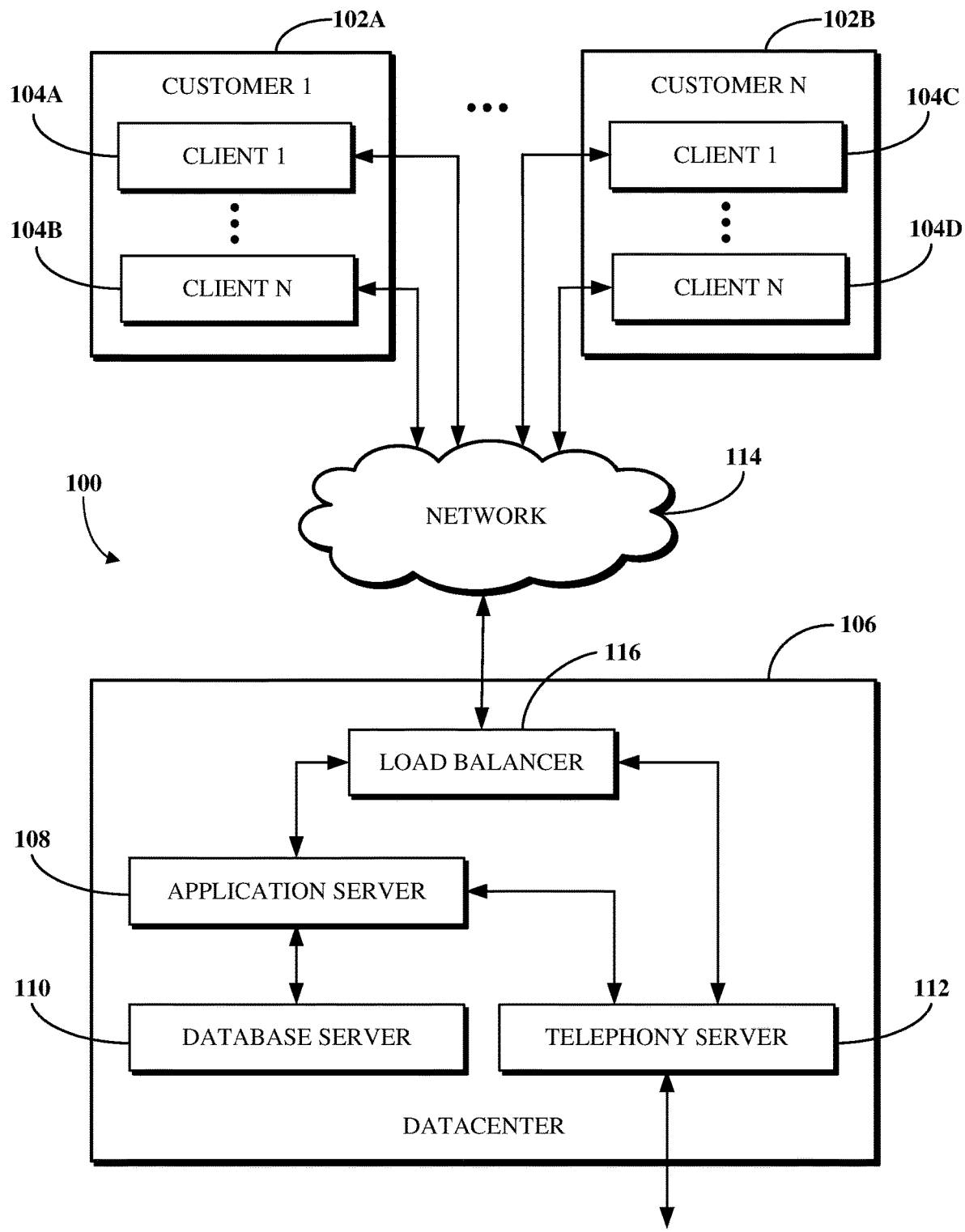
FIG. 1 is a block diagram of an example of an electronic computing and communications system.

Conferencing software is frequently used across various industries to support conferences between participants in multiple locations. In many cases, one or more of the conference participants is physically located in and connects to the conferencing software from a conference room (e.g., in an office setting), and other conference participants connect to the conferencing software from one or more remote locations. Conferencing software thus enables people to conduct conferences without requiring them to be physically present with one another. Conferencing software may be available as a standalone software product or it may be integrated within a software platform, such as a unified communications as a service (UCaaS) platform.

A physical space, for example, a conference room, may be configured to support video conferences using a display of a shared device. For example, the shared device may be a television or large monitor connected to a computing device that accesses conferencing software. A camera used by the computing device may be configured to capture video of participants within the physical space during a video conference. The display of the shared device outputs video content associated with a video conference, which may include the video captured by the camera of the computing device, screen share content, video streams for individual participants or groups of participants, digital whiteboard content, or the like. As such, the functional operation of the display is critical to the ability of participants within the physical space to effectively participate in a video conference.

The display of a shared device within a physical space may from time to time be or be placed (i.e., by human action or otherwise) in a state that renders the display incapable of functional operation for video conferencing. For example, the shared device may be manually set to an input source other than a specific one configured for use with the computing device used to connect the shared device to a video conference. In another example, output configurations (e.g., brightness, contrast, and/or saturation settings) for the display may be changed in a way that materially alters the usability of the display for video conferencing. In yet another example, the shared device may have been accidentally unplugged, or a lighting panel thereof may be malfunctioning or defective. In some cases, a client application running at the computing device that uses the shared device display may be able to detect issues that cause the display to be in such a state, for example, based on a determination that no display is connected to the computing device. However, the client application may not be able to detect some issues that cause the display to be in such a state. For example, the client application may not be able to determine that the display is set to an input channel other than the one configured for use with the computing device or that a lighting panel of the display is malfunctioning or defective.

Implementations of this disclosure address problems such as these by performing illumination testing to passively check the health of a display of a shared device within a physical space, such as a conference room. Performing the illumination testing includes outputting a test pattern to the display of the shared device within the physical space. The test pattern is an image or sequence of images that includes certain content usable to cause the display to illuminate the physical space in an expected manner. A camera used by a computing device within the physical space captures a test image of the physical space while the test pattern is output at the display. The computing device may be the shared device or a different device. The test image is compared against a reference image depicting an expected illumination of the physical space according to the test pattern to determine whether the display is in a fail state. Where the test image matches or otherwise is within a threshold range of the reference image, a determination is made that the display is in an operational state capable of supporting a video conference. However, where the test image does not match or is otherwise not within a threshold range of the reference image, a determination is made that the display is in a fail state.

In some cases, one or more actions may be performed to attempt to resolve the fail state. For example, input channels may be iteratively cycled through at the display while the test pattern is output thereto and new test images may be captured at each input channel. Where such a new test image is determined to match or be within a threshold range of the reference image, the display, by being placed in the correct input channel, may be determined to now be in an operational state. Based on the display being determined to be in a fail state, a notification may be transmitted to an administrator device to indicate the fail state. Where the fail state is resolved by an action placing the display in an operational state, the notification may also indicate such a resolution and the cause of the fail state.

To describe some implementations in greater detail, reference is first made to examples of hardware and software structures used to implement a system for illumination testing for shared device displays. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
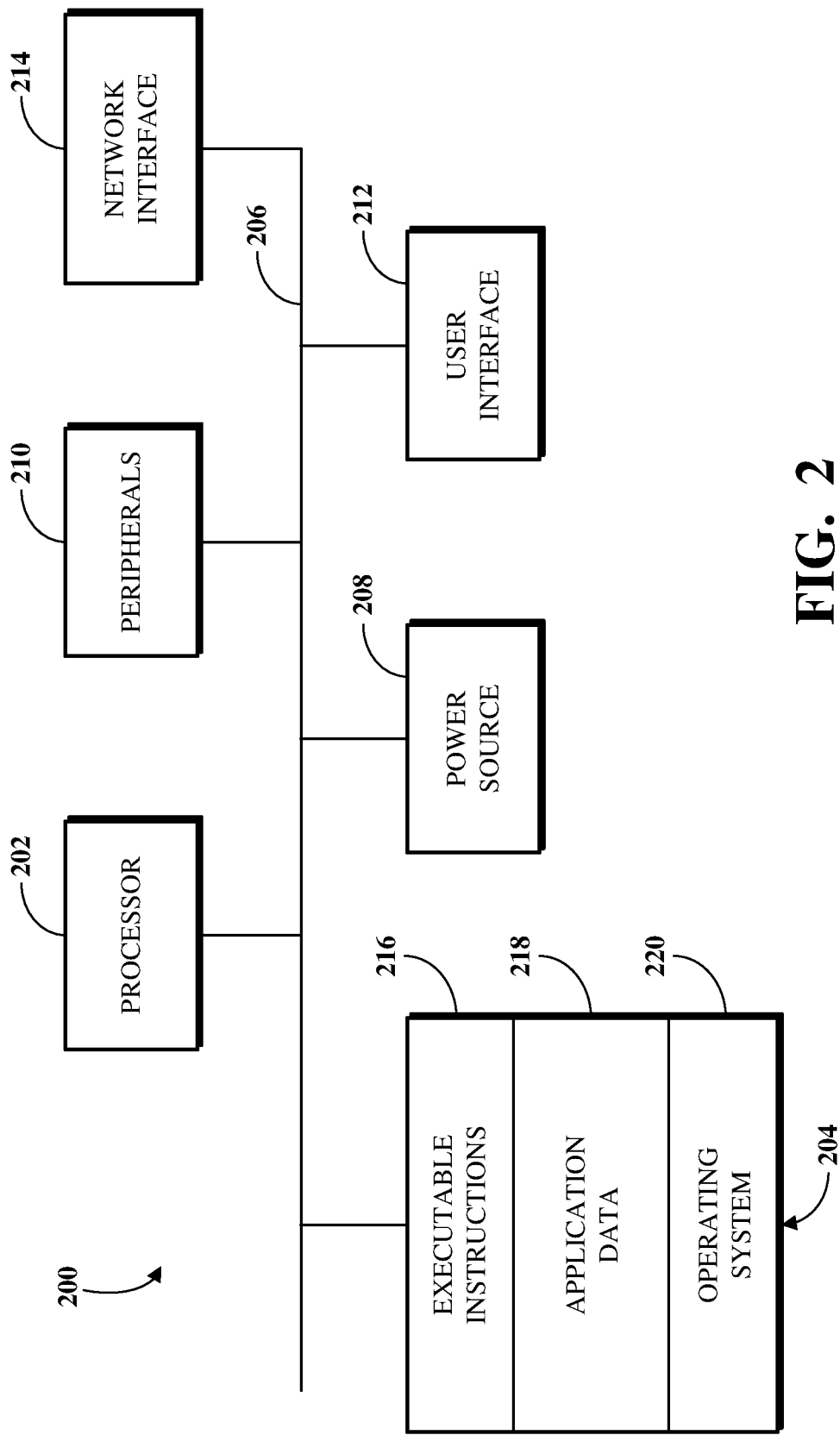
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
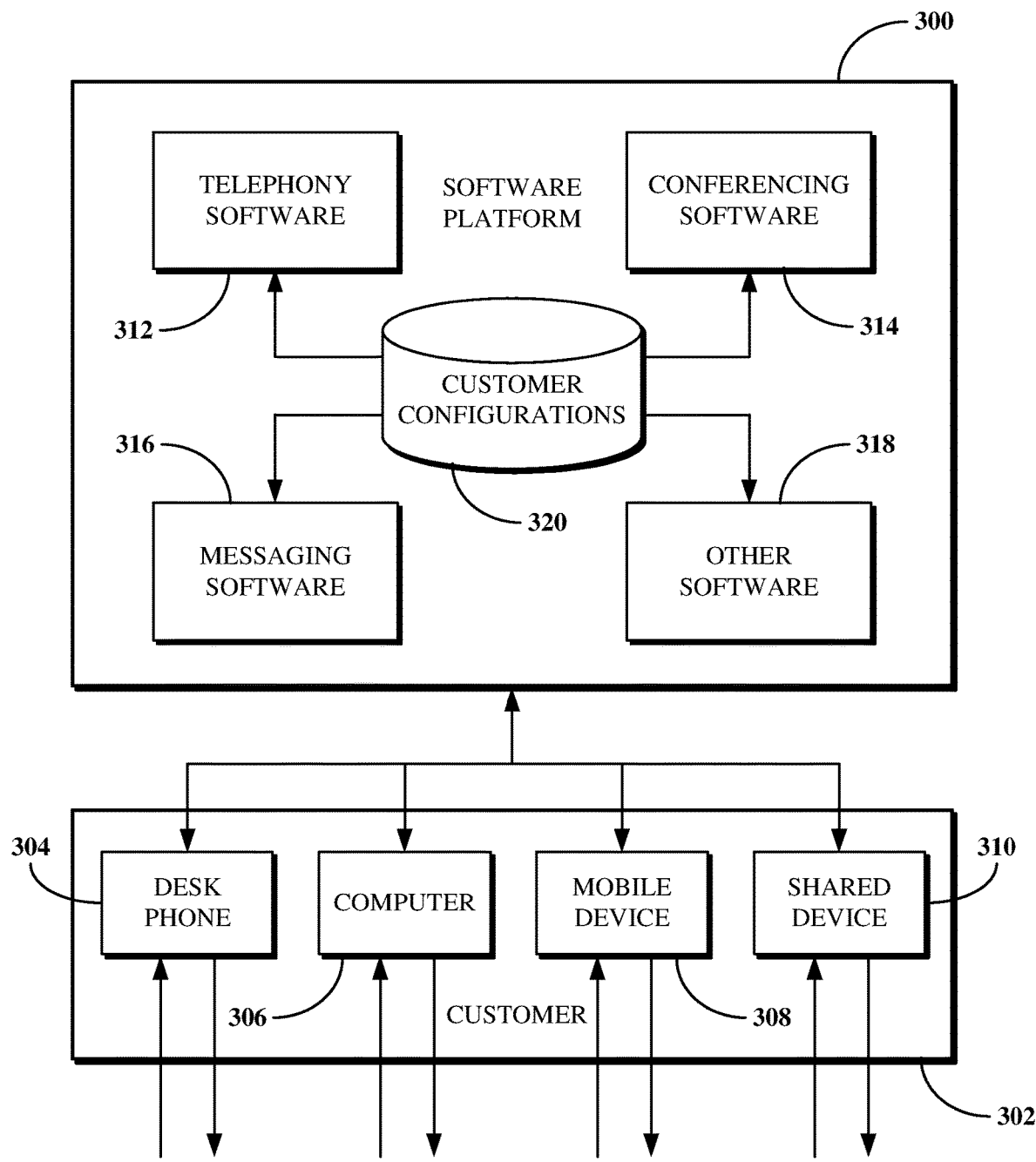
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for illumination testing for shared device displays.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
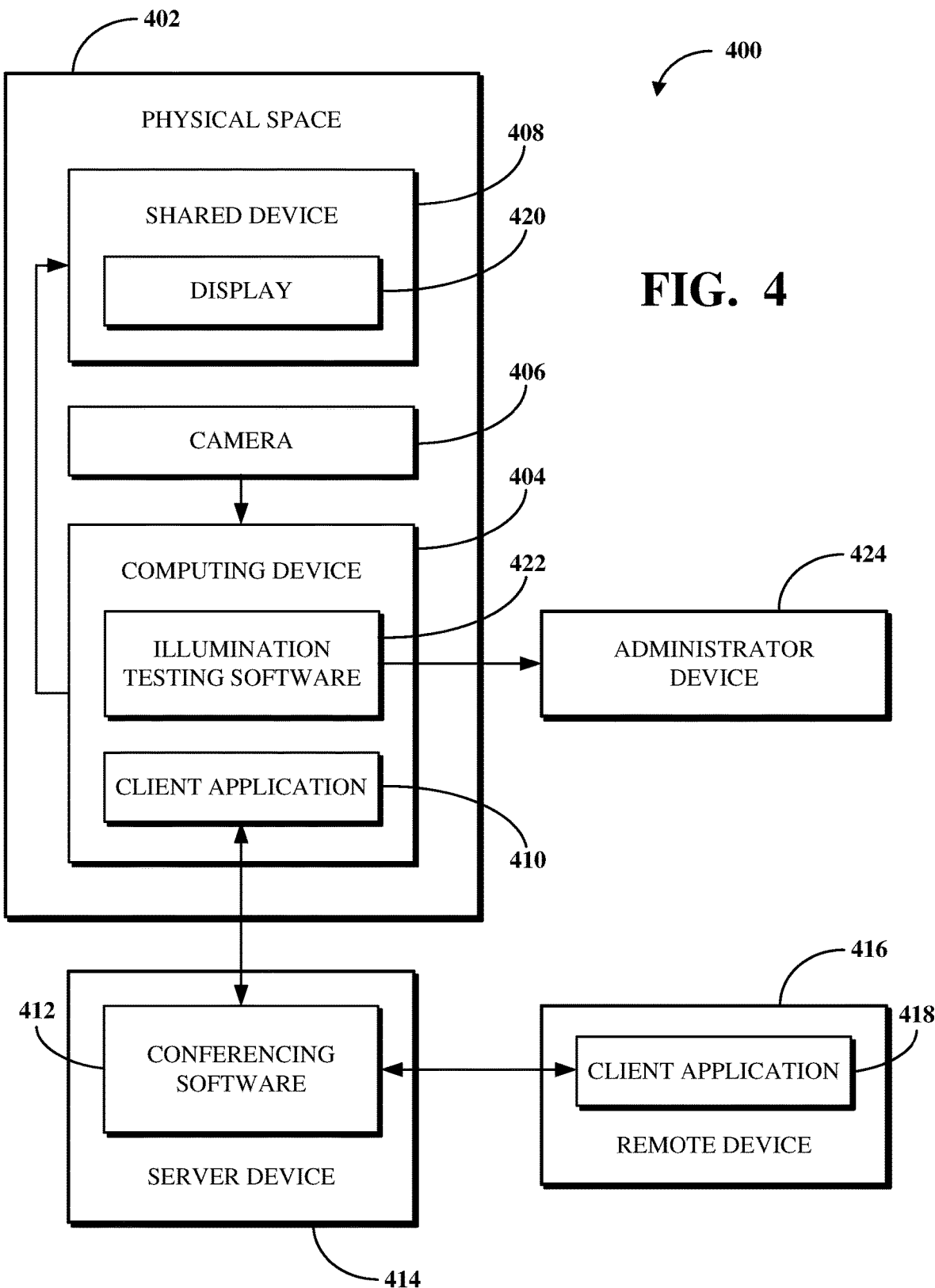
FIG. 4 is a block diagram of an example of a system for illumination testing for shared device displays.

FIG. 4 is a block diagram of an example of a system 400 for illumination testing for shared device displays. The system 400 includes devices within a physical space 402, which is a place at which one or more people may be present in-person to participate in a video conference. For example, the physical space 402 may be a conference room, a shared office, or a private office. The devices within the physical space 402 include a computing device 404, a camera 406, and a shared device 408. The computing device 404 runs a client application 410 configured to connect to conferencing software 412 running at a server device 414 external to the physical space 402. The computing device 404 may, for example, be a client device, such as one of the clients 304 through 310 shown in FIG. 3. The conferencing software 412 may, for example, be the conferencing software 314 shown in FIG. 3.

Persons within the physical space 402 can thus participate in a video conference implemented by the conferencing software 412 via the client application 410. In particular, the camera 406, which is configured for use with the computing device 404, captures images of a portion of the physical space 402 within a field of view of the camera 406 and provides those captured images to the computing device 404. The computing device 404, via the client application 410 or otherwise, packages the images into a video stream for the physical space 402. The client application 410 transmits the video stream to the conferencing software 412 for processing to prepare the video stream for rendering as output to other devices connected to the video conference, such as a remote device 416 external to the physical space 402. For example, the remote device 416 may run a client application 418 (e.g., another instance of the client application 410 or a separate application altogether) for connecting the remote device 416 to the video conference.

Similarly, the conferencing software 412 processes a video stream from the remote device 416 to prepare same for rendering as output to other devices connected to the video conference, such as the computing device 404. Media processed at the computing device 404 for output to users of the computing device 404 (i.e., the video conference participants in-person within the physical space 402) may be output via the shared device 408. The shared device 408 may, for example, be a television, a video monitor, or a video projector. The shared device 408 includes a display 420 at which the media presented for rendering by the computing device 404 may be output, for example, for viewing by the in-person participants within the physical space 402. For example, the display 420 may be a LCD or LED screen of a television or video monitor. Thus, during a video conference, participants may be visually represented to persons within the physical space 402 within a user interface output for display at the display 420.

The computing device 404 further runs illumination testing software 422 for determining a state of the shared device 408. The state of the shared device 408 may be expressed as either an operational state, indicating that the shared device 408 is in condition to support video conference output as described above, or a fail state, indicating that the shared device 408 is not in condition to support video conference output as described above. The illumination testing software 422 performs an illumination test within the physical space 402 to determine the state of the shared device 408. Generally, the illumination test is performed other than during a video conference. For example, the illumination test may be automated, such as on a defined schedule indicating to perform the illumination test overnight or otherwise outside of normal business hours. In another example, the illumination test may be manually triggered, such as from an administrator device 424 used by an administrator of the physical space 402. While the illumination testing software 422 is shown as being separate from the client application 410, in some implementations, the client application 410 can include the illumination testing software 422. For example, the illumination testing software 422 may in some cases represent functionality of the client application 410 rather than of a separate software aspect.

To perform the illumination test, the illumination testing software 422 causes the computing device 404 to output a test pattern to the display 420 of the shared device 408. The test pattern includes visual content such as one or more colors arranged in one or more shapes. For example, the test pattern may include multiple bars (e.g., rectangles) each having different colors or otherwise arranged in a repeating color pattern. In another example, the test pattern may include the multiple bars as described above in a first portion and other content, such as black and white bars, in a second portion. In yet another example, the test pattern may be a single solid color. In yet another example, the test pattern may include four quadrants each displaying colors of different color families (e.g., red, yellow, green, and blue) or different hues or shades of one or more color families (e.g., four different hues or shades of blue). In yet another example, shapes depicted within a test pattern may be other than rectangular.

To cause the computing device 404 to output the test pattern to the display 420, the illumination testing software 422 accesses a data store at which the test pattern is stored and instructs the computing device 404 to use image viewing software to render the test image for output at the display 420. The data store may be local at the computing device 404. Alternatively, the data store may be external to the computing device 404, such as at the server device 414. The image viewing software may be included in the client application 410 or the illumination testing software 422. Alternatively, the image viewing software may be other software running (e.g., locally) at the computing device 404.

While the test pattern is output to the display 420, the illumination testing software 422 causes the camera 406 to capture a test image of the physical space 402. The illumination testing software 422 then compares the test image against a reference image to determine a state of the display 420 and thus of the shared device 408. The reference image is an image previously captured using the camera 406 within the physical space 402 while the same test pattern output in connection with the capture of the test image as described above is output to the display 420. In particular, the reference image depicts an expected illumination within the physical space 402 according to the test pattern (i.e., while the test pattern is output at the display 420). The illumination refers to the lighting of the physical space 402 (e.g., the walls and other fixed surfaces thereof) and contents therein (e.g., furniture, non-fixed surfaces, and fixed or non-fixed objects) based on the content of the test image. For example, where the test image is a solid blue color only, the illumination depicted within the reference image will show the physical space 402 and the contents therein generally as reflecting that blue color. The reference image may be accessed by the illumination testing software 422 from within a data store, for example, the same data store which stores the test pattern or a different data store.

The state of the display 420, determined using the illumination testing software 422, is based on whether the test image matches or is otherwise within an acceptable threshold range of the reference image. In particular, the illumination testing software 422 performs color matching against the test image and the reference image to determine a percentage of pixels of the test image that have color values matching color values of co-located pixels of the reference image. The color values may correspond, for example, to chrominance plane data of the respective images. In this way, the test image can be evaluated to determine whether the test pattern, that is known to produce the illumination represented in the reference image, is actually displayed at the display 420 when the test image is captured. The state of the display 420 may accordingly be determined as an operational state where the percentage of pixels of the test image that match the co-located pixels of the reference image is equal to or above a threshold (e.g., 90 percent). Similarly, the state of the display 420 may be determined as a fail state where that percentage is below the threshold. Another way to express the threshold comparison is to determine that the display 420 is in a fail state where a difference between the test image and the reference image meets (e.g., is equal to or exceeds) a threshold (e.g., 10 percent), and thus to determine that the display 420 is in an operational state where the difference between the test image and the reference image is below the threshold.

Thus, the state of the display 420 is largely a measurement of whether and/or how the test pattern is output at the display 420 when the test image is captured. For example, where the illumination testing software 422 determines that the display 420 is in a fail state, it may indicate that the test pattern, despite being output to the display 420 (i.e., by the computing device 404 causing image viewing software to render the test pattern), is not actually being output at the display 420 (i.e., for viewing). In some such cases, this may be because the display 420 is presently set to an incorrect input channel or in a power mode other than one capable of causing the display 420 to actually output the test pattern for viewing. In another example, where the illumination testing software 422 determines that the display 420 is in a fail state, it may indicate that something about the display 420 has failed or otherwise malfunctioned causing the test pattern to not illuminate the physical space 402 in the manner expected (i.e., as depicted in the reference image). In some such cases, this may be because of a malfunction of one or more lighting zones of the display 420 that cause pixel data to be perceptible.

The determined state of the display 420 may in at least some cases be indicated by the illumination testing software 422 to the administrator device 424. For example, the illumination testing software 422 may be configured to routinely transmit data indicating an outcome of the state determination (e.g., operational or fail) to the administrator device 424 via a notification, such as an email, a text message, an instant message, or a chat message. In another example, the illumination testing software 422 may be configured to only transmit data indicating an outcome of the state determination when the determined state is a fail state. In such a case, notifications from the illumination testing software 422 to the administrator device 424 may be treated as alerts indicating a fail state of the display 420.

In some implementations, such notifications may be transmitted to one or more other devices in addition to or instead of the administrator device 424. For example, where the physical space 402 is subject to reservations for video conferences, a notification may be transmitted to a device associated with a person who has a next reservation for the physical space 402. In this way, that person, who may, for example, be the host of a video conference to be participated in from the physical space 402, may receive advance notice of an issue with the display 420 and potentially opt to move their reservation to a different space. In some implementations, the physical space 402 may be placed in a correction mode indicating to users of a service for reserving the physical space 402 that the display 420 is in a fail state pending further investigation. The placement of the physical space 402 in the correction mode may, for example, prevent further reservations of the physical space 402 until the fail state is resolved.

Where the determined state is a fail state, the illumination testing software 422 may in some cases perform an illumination re-test after applying some change to the shared device 408. For example, the illumination testing software 422 may cause an input channel of the display 420 to change from a current (e.g., first) input channel to a new (e.g., second) input channel. The illumination testing software 422 may, in response to the change in input channel, then cause the camera 406 to capture a second test image while the test pattern is output to the display 420 and while the display is set to the new input channel.

Where a comparison between that second test image and the reference image meets the pixel value match threshold, the state of the display 420 may be changed from the fail state to the operational state. Where the comparison still does not meet the threshold, the illumination testing software 422 may continue to iterate through remaining input channels by comparing new test images captured while the display 420 is set to ones of those other input channels. In the event one such comparison results in a change in state of the display 420 to the operational state, a notification may be transmitted to the administrator device 424 to indicate the earlier determination of the fail state and the action performed (e.g., changing the input channel of the display 420 to from a first input channel to a second input channel) to cause the state to change to the operational state. In the event no such comparison results in a change in state of the display 420 to the operational state, a notification may be transmitted to the administrator device 424 as described above to alert the administrator as to the fail state of the display 420.

In some implementations, given that certain non-fixed objects may from time to time be moved around within, into, or from the physical space 402, the illumination testing software 422 may be configured to perform the comparison between only certain portions of the test image and the reference image. For example, the pixels of the test image that are compared to co-located pixels of the reference image may be limited to a portion of the test image and the reference image that is expected to omit non-fixed objects. In one such case, the comparison may be between pixels that represent walls and a ceiling of the physical space 402 only. Alternatively, a lower percentage (e.g., 50 percent) may be used for the comparison between the test image and the reference image to accommodate situations in which objects are known or expected to frequently be moved within, into, or from the physical space 402.

In some implementations, to account for the potential movement of objects into, from, and/or within the physical space 402, the reference image may be captured more close in time to the capture of the test image. For example, the reference image may be scheduled for capture at an end of a business day. The administrator of the physical space 402 may, in at least some such cases, verify the reference image by a manual review thereof at the administrator device 424. For example, the reference image may be transmitted to the administrator device 424 for verification following the capture thereof. Verification of the reference image at the administrator device 424 can include obtaining input from the administrator device 424 indicative of whether an expected illumination of the physical space 402 according to the subject pattern appears to be depicted within the reference image. Alternatively, where the reference image does not depict illumination and merely depicts the physical space 402 in a non-illuminated state, as will be further described below, verification of the reference image at the administrator device 424 can include obtaining input from the administrator device 424 indicative of whether the reference image depicts the physical space 402. In some implementations, whether or not the reference image an depicts illumination of the physical space 402, the reference image may be captured more close in time to the capture of the test image without manual verification.

In some implementations, the illumination testing software 422 can perform an illumination test using a reference image other than a reference image which depicts an expected illumination of the physical space 402 according to the test pattern used for the illumination test. For example, the reference image may depict the physical space 402 illuminated by the display 420 when the shared device 408 is in an on and non-use state. The on and non-use state of the shared device 408 may refer to the shared device 408 being powered on and ready for use without actively being in-use. For example, in this state, the display 420 may depict a solid color (e.g., a blank screen), a screen saver image, or another background image. The reference image may thus depict the illumination of the physical space 402 according to same instead of according to the test pattern to use for the illumination test. In some such implementations, comparing the reference image and the test image can include determining whether changes in color values between co-located pixels in some or all of the reference image and the test image match or are otherwise within a threshold range of an expected diff value. In another example, the reference image may depict the physical space 402 without illumination, such as when the shared device 408 is in an off state. The off state of the shared device 408 may refer to the shared device 408 being powered off or otherwise in a rest state during which it is not ready for use. In some such implementations, comparing the reference image and the test image can include determining whether changes in color values between co-located pixels in some or all of the reference image and the test image depict illumination. For example, the comparison in such a case may include determining a magnitude of a change in reflection depicted between the test image and the reference image. Thus, performing the illumination test in such a case may include determining whether an illumination of the physical space 402 according to the test pattern is depicted within the test image.

The test pattern is described above as being a single image, regardless of the content thereof, which is output to the display 420 while the test image is captured. However, in some implementations, the test pattern includes a sequence of images rather than a single image. For example, the sequence of images can include two or more images each including different test patterns. For each image of the sequence of images, the illumination testing software 422 may cause the camera 406 to capture a different test image. The illumination testing software 422 may then compare those respective test images against reference images corresponding to each image of the sequence of images. In some such implementations, the illumination testing software 422 may cause the computing device 404 to output each next image of the sequence of images on some discrete time interval basis (e.g., every five seconds) to give the camera 406 sufficient time to capture the individual test images. In some such implementations, the state of the display 420 may be determined based on a requirement that all of the test images have a threshold match to their corresponding reference images. In other such implementations, the state of the display 420 may be determined as an operational state where at least one such test image has a threshold match to its corresponding reference image.

In some implementations, the camera 406 may be included in the shared device 408 or the computing device 404. For example, the camera 406 may be enclosed within an audio/visual unit including the camera 406, one or more microphones, and one or more speakers. The audio/visual unit may, for example, be integrated within or otherwise connected to the shared device 408 via wired or wireless coupling. For example, the audio/visual unit may be affixed to a bottom surface of the shared device 408 and connected to the shared device 408 using a high-definition multimedia interface (HDMI) cable. In some implementations, the physical space 402 may include a second camera located other than at the location of the shared device 408 or the computing device 404. For example, the second camera may be located on a wall opposite or perpendicular to the wall on which the camera 406 is located. In some such implementations, the second camera may be used by the illumination testing software 422 to capture the reference image and the test image for the illumination test of the display 420.

In some implementations, the computing device 404 and the shared device 408 may be combined into a single device. For example, a single device (e.g., a laptop computer or a smart television) may be referred to as a shared device of the physical space 402, include the display 420, and run the client application 410 and the illumination testing software 422. In some such implementations, the single device may include the camera 406, as well.

In some implementations, a request to recalibrate the physical space 402 for illumination testing may from time to time be obtained or otherwise processed by the illumination testing software 422. For example, the recalibration request may be based on an indication, transmitted from the administrator device 424, of a change to the physical space 402 that would cause further illumination tests using a current reference image to result in false outcomes. In some such implementations, the illumination testing software 422 may, based on such a recalibration request, cause a test pattern to be output to the display 420 and then cause the camera 406 to capture a new reference image for the physical space 402 while the test pattern remains output to the display 420. The new reference image may thereafter be used in further illumination tests for the physical space 402, such as by comparing further test images captured thereafter against the new reference image to determine a state of the display 420.

In some implementations, the physical space 402 may include one or more network-connected sensors configured to automate use of one or more network-connected devices of the physical space 402. For example, the one or more network-connected sensors may be internet-of-things (IoT) sensors configured to generate sensor data usable to open, close, turn on, turn off, or otherwise control the network-connected devices of the physical space 402, which may, for example, include window blinds, doors, lights, and computing devices or shared devices other than the computing device 404 and the shared device 408. In some such implementations, the illumination testing software 422 may be configured to cause all such network-connected devices to enter a rest state prior to causing the camera 406 to capture the test image. In some such implementations, the illumination testing software 422, based on a determination of a fail state for the display 420, may request or otherwise obtain measurements from the network-connected sensors to determine whether to selectively control one or more of the network-connected devices (e.g., by closing same or turning same off). For example, based on a change to a network-connected device, the illumination testing software 422 may cause an illumination re-testing including by causing the camera 406 to capture a new test image for further comparison against the reference image, as described above.

In some such implementations, determining a state of the display 420 can include comparing a first test image captured while a network-connected light of the physical space 402 is off and a test pattern is output to the display 420 against a first reference image depicting an expected illumination of the physical space 402 when the light is off and the test pattern is output to the display 420 as well as comparing a second test image captured while the light is on and the test pattern is output to the display 420 against a second reference image depicting an expected illumination of the physical space 02 when the light is on and the test pattern is output to the display 420. For example, a fail state may be determined for the display 420 where either such comparison results in a pixel value match below the above-described threshold.

In some implementations, the physical space 402 may include multiple shared devices each having a different display. For example, there may be multiple televisions or video monitors positioned next to one another to give the appearance of a single, large screen for use with video conferences participated in from the physical space 402. In some such implementations, performing an illumination test for the physical space 402 may include performing the illumination testing operations described above for each display individually and indicating the separate states of each such display.

Figure 5:
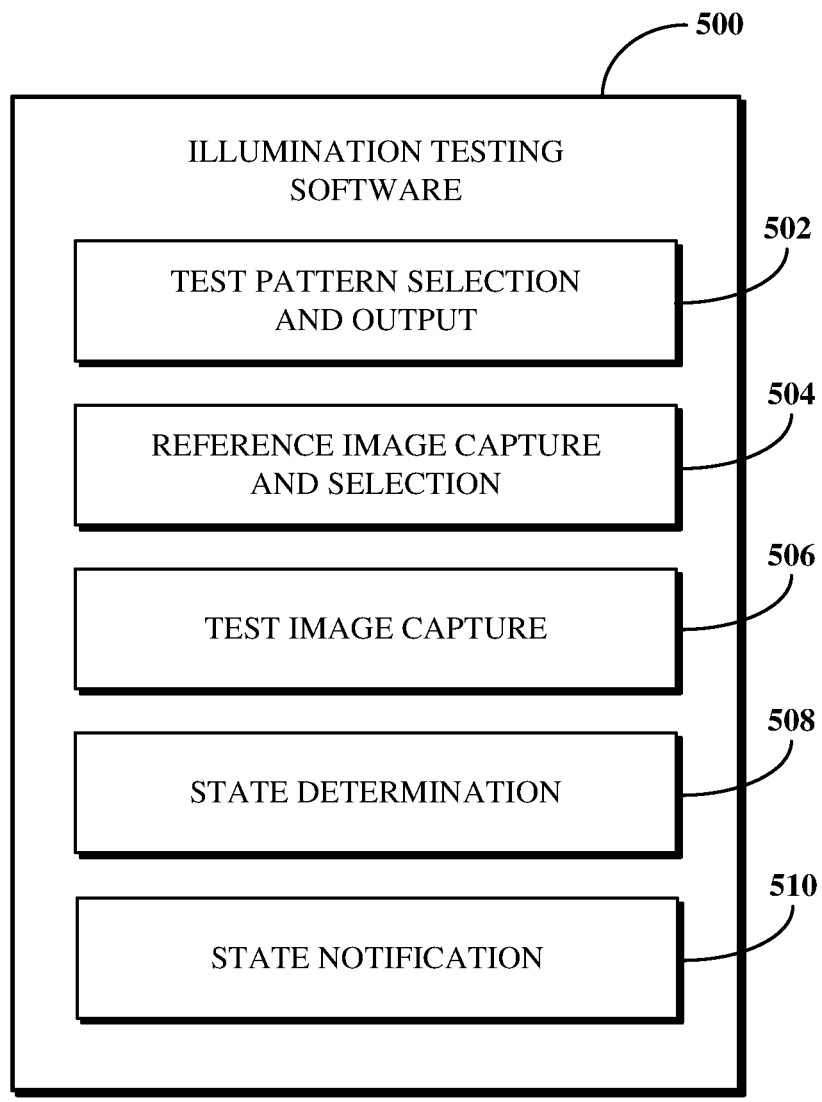
FIG. 5 is a block diagram of example functionality of illumination testing software.

FIG. 5 is a block diagram of example functionality of illumination testing software 500, which may, for example, be the illumination testing software 422 shown in FIG. 4. The illumination testing software 500 includes tools, such as programs, subprograms, functions, routines, subroutines, operations, and/or the like, for performing illumination testing as disclosed herein for shared device displays, for example, the display 420 of the shared device 408 shown in FIG. 4. As shown, the illumination testing software 500 includes a reference image capture and selection tool 502, a test pattern selection and output tool 504, a test image capture tool 506, a state determination tool 508, and a state notification tool 510.

The test pattern selection and output tool 502 selects a test pattern to use for illumination testing within a physical space (e.g., the physical space 402 shown in FIG. 4) and causes that test pattern to be output to a display of a shared device within that physical space at one or more times including to capture a reference image prior to such an illumination test or a test image during such an illumination test. The test pattern is output to the display to cause the display to illuminate the physical space according to the test pattern. In particular, the test pattern selection and output tool 502 obtains information identifying the physical space and accesses a data store storing test patterns to obtain the test pattern used for the physical space. For example, metadata identifying the physical space may be stored in connection with a certain test pattern.

The test pattern used for the physical space generally refers to a latest test pattern used to capture a reference image and to capture a test image in the physical space. For example, where an office premises has two physical spaces and a first test pattern is used for the first physical space and a second, different test pattern is used for the second physical space, the test pattern selection and output tool 502 will select the first test pattern for output for illumination testing of a display of the first physical space and the second test pattern for output for illumination testing of a display of the second physical space. However, where the second test pattern is later used to capture a new reference image for the first physical space, the test pattern selection and output tool 502 will begin selecting the second test pattern for output for illumination testing of the display of the first physical space, as well.

In some implementations, the test pattern selection and output tool 502 can generate a test pattern specific to the physical space in which the test pattern will be used for the illumination testing. For example, the test pattern can be generated according to detected characteristics of the physical space, including, without limitation, paint colors used in the physical space, reflective surfaces within the physical space, and/or dimensions of the physical space. In one such example, the test pattern selection and output tool 502 can perform a color analysis of the physical space to detect common colors present in the physical space and then select inverse colors of those detected colors according to a color theory model. The test pattern for the physical space may then be generated using those inverse colors. This may, for example, increase the likelihood of the color content of the test pattern being recognizable within an illumination of the physical space according to the test pattern.

The reference image capture and selection tool 504 captures a reference image to use for illumination testing within a physical space and selects the reference image for the illumination testing at the time of such testing. Given that the reference image will serve as the point of comparison for future test images, the reference image may be captured based on a request or instructions received from an administrator device, for example, the administrator device 424 shown in FIG. 4, indicating that the physical space is prepared for the reference image to be captured. The reference image is captured while a specific test pattern is output to the display of a shared device within the physical space, and, moreover, while the test pattern is verifiably output at the display for perceptible viewing. This ensures that the reference image depicts an expected illumination of the physical space according to the test pattern and thus is not a false representation of illumination of the physical space according to the test pattern. The reference image capture and selection tool 504 selects the reference image to use for an illumination test for a physical space at a time of such an illumination test based, for example, on metadata identifying the physical space stored in connection with the reference image.

The test image capture tool 506 causes a camera of the physical space to capture a test image while the test pattern selected and output by the test pattern selection and output tool 502 is output to the display within the physical space. The test image is thus an image captured within the physical space while the test pattern is output to the display within the physical space. As such, where the test pattern is properly being output (i.e., visually perceptible) at the display, the test image will depict the physical space illuminated according to the test pattern. However, where the test pattern is not being output at the display (e.g., merely being output to the display, but not visually perceptible at the display), the test image will not depict the physical space illuminated according to the test pattern. The test image capture tool 506 stores the test image for further processing as part of the illumination testing for the physical space.

The state determination tool 508 determines a state of the display within the physical space by comparing the test image captured by the test image capture tool 506 against the reference image selected for the illumination testing by the reference image selection and output tool 504. In particular, the state determination tool 508 determines whether the display is in a fail state or an operational state based on a degree to which the test image matches the reference image. To compare the test image and the reference image, the state determination tool 508 performs a color analysis against some or all of the test image and co-located portions of the reference image. Performing the color analysis includes determining color (e.g., chrominance plane) values for pixels of the test image, determining or otherwise identifying (e.g., where same is previously stored) color values of co-located pixels of the reference image, and determining whether the color values of the test image match respective ones of the color values of the reference image. For example, the comparison may result in a percentage of such color values that match or that do not match. The state determination tool 508 then determines the state of the display based on whether that percentage meets a threshold. For example, where the comparison indicates a percentage of color values that match that is above a threshold, the state determination tool 508 may determine the display to be in an operational state. Where the comparison indicates a percentage of color values that do not match that is below a threshold, the state determination tool 508 may determine the display to be in an operational state. In other cases, the state determination tool 508 may determine the display to be in a fail state.

In some implementations, the state determination tool 508 may be configured to perform or otherwise cause one or more illumination re-tests based on an initial determination of a fail state for the display of the shared device within the physical space. For example, the state determination tool 508, using configurations or access privileges (e.g., operating system-level privileges) granted to the illumination testing software 500, may cause an input channel of the display to change from a first input channel to a second input channel and then re-invoke the test image capture tool 506 to cause the camera to capture a second test image while the test pattern is output to the display and the display is set to the second input channel. The state determination tool 508 may then repeat the pixel value comparison between the reference image and the second test image to determine the state of the display.

In some such implementations, illumination re-testing may be guided by a pre-defined sequence of operations. For example, a first operation may include the illumination testing software 500 causing a computing device that uses the shared device to verify that the shared device is accessible (i.e., powered on). In a next operation, the illumination testing software 500 may cause the computing device to determine whether network packets are being received from the shared device or otherwise to verify that the shared device is communicating data with the computing device. In a final operation, the illumination testing software 500 may perform the input channel change described above, iteratively through the available input channels of the display until an input channel resulting in an operational state determination is changed to for an illumination re-testing.

In some implementations, where no test image is captured using the camera, the state determination tool 508 may omit the comparison described above and instead immediately indicate a fail state for the physical space, rather than specifically for the display of the shared device. For example, the fail state for the physical space can indicate a failure of the camera based on the test image not being captured. In some such implementations, the state determination tool 508 may determine that no test image was captured based on a search through a directory to which the test images are saved returning no results of a test image captured during a time period of the subject illumination test.

In some implementations, the state determination tool 508 can perform object detection against the test image to detect objects and their locations within the physical space at the time of test image capture. The state determination tool 508 can then compare color values of pixels within a region of the test image corresponding to the detected object against color values of co-located pixels of the reference image. For example, the region of the test image may be represented using a bounding box drawn by the illumination testing software 500 around an object detected within the test image, and corresponding values of the reference image at the same location as the bounding box may then be used for the comparison. In some such implementations, where the values within the bounding box in the test image do not match the co-located values within the reference image but values outside of the bounding box in the test image do match or meeting a threshold when compared to their co-located values within the reference image, the values within the bounding box may be excluded from the state determination process.

The state notification tool 510 transmits a notification indicative of the state of the display determined by the state determination tool 508 to one or more devices, such as an administrator device. In particular, the state notification tool 510 may transmit a notification to an administrator device associated with the subject physical space to indicate when the display within the physical space is determined to be in a fail state. In some cases, where an illumination re-test is performed and the fail state is resolved (i.e., by a determination during the re-test that the display is in an operational state), the notification may further indicate that the display was previously in the fail state and is now in an operational state. In some such cases, the notification may further indicate an action performed (e.g., changing of an input channel) that resulted in the resolution of the previously determined fail state for the display. In some implementations, where an object is detected in the test image and determined to not also be in the reference image, the notification may further indicate the presence of an unexpected object within the physical space. In some such implementations, object recognition may be performed against the portion of a test image within which a detected object is located to identify the object. In such a case, an indication of the type of object (e.g., a free-standing whiteboard) may be indicated within the notification, as well.

In some implementations, the notification can include one or more audit images depicting the display of the shared device during the illumination test. For example, based on a determination that the display is in a fail state using the state determination tool 508, the state notification tool 510 may cause an audit image of the display of the shared device to be captured using a second camera located within the physical space. The audit image depicts the display of the shared device while the test pattern is output thereto. The audio image can thus be viewed or otherwise processed (e.g., using a machine vision system) to understand whether the test pattern is actually output in a visually perceivable manner at the display during the illumination test.

Although the tools 502 through 510 are shown as functionality of the illumination testing software 500 as a single piece of software, in some implementations, some or all of the tools 502 through 510 may exist outside of the illumination testing software 500 and/or the software platform may exclude the illumination testing software 500 while still including the some or all of tools 502 through 510 in some form elsewhere. For example, some or all of the tools 502 through 510 may be implemented by a client application running at a client device, for example, one of the client devices 304 through 310 shown in FIG. 3, or otherwise by software running at a computing device that uses the shared device display under illumination testing, for example, the computing device 404 shown in FIG. 4.

In some implementations, the illumination testing software 500 may include tools other than the tools 502 through 510, such as in place of or in addition to one or more of the tools 502 through 510. For example, the illumination testing software 500 may include a learning tool that uses a trained machine learning model to recognize patterns in outcomes of state determinations performed for one or more physical spaces. In some such implementations, the machine learning model may be trained to predict a fail state for a physical space or a cause of a fail state for a physical space. For example, the machine learning model may be trained using sets of training data samples, each set including one or more of a reference image, a test image, a state determination outcome, and optionally an indication of one or more detected objects that resulted in differences between the reference image and the test image. In particular, the machine learning model may process a current reference image and a current test image for a given physical space to determine whether a fail state of the physical space determined based on a comparison of those two current images is caused by something other than an unexpected illumination or non-illumination of the physical space depicted in the test image. In this way, the machine learning model may be trained to recognize false negatives (e.g., determinations of fail states resulting from object presence where the display of the shared device properly illuminates the physical space according to the test pattern, as expected based on the reference image) and to learn which causes of fail state outcomes are likely for a given physical space. The machine learning model may, for example, be or include one or more of a neural network (e.g., a convolutional neural network, recurrent neural network, or other neural network), decision tree, vector machine, Bayesian network, genetic algorithm, deep learning system separate from a neural network, or other machine learning model.

Figure 6A:
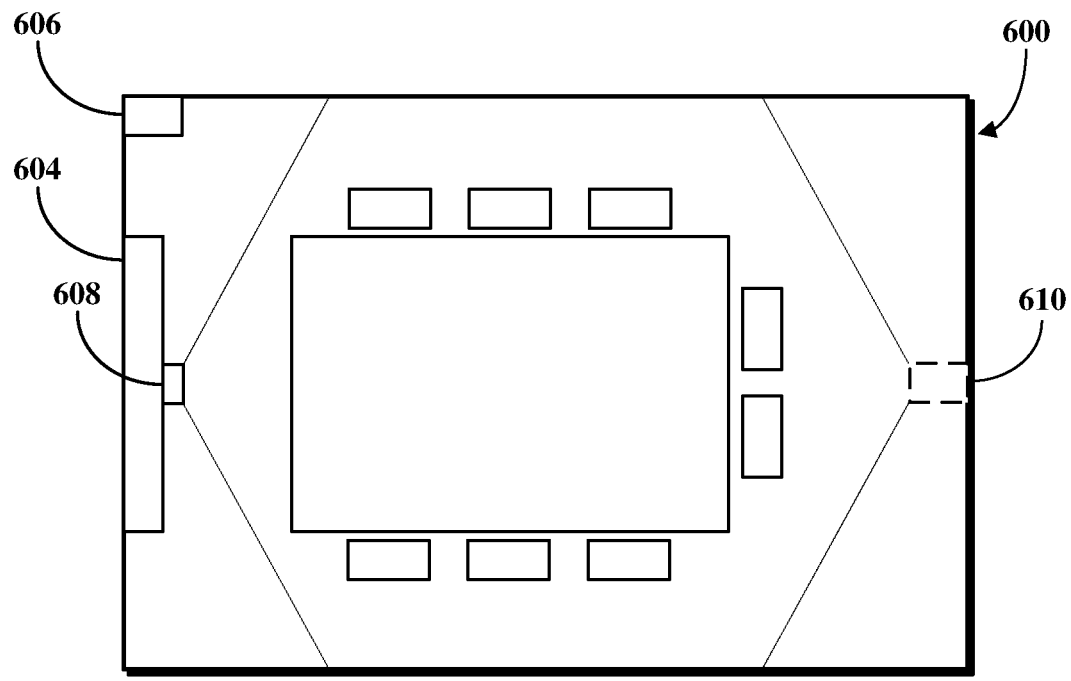
FIGS. 6A-B are illustrations of examples of physical spaces within which illumination testing for shared device displays may be performed.
Figure 6B:
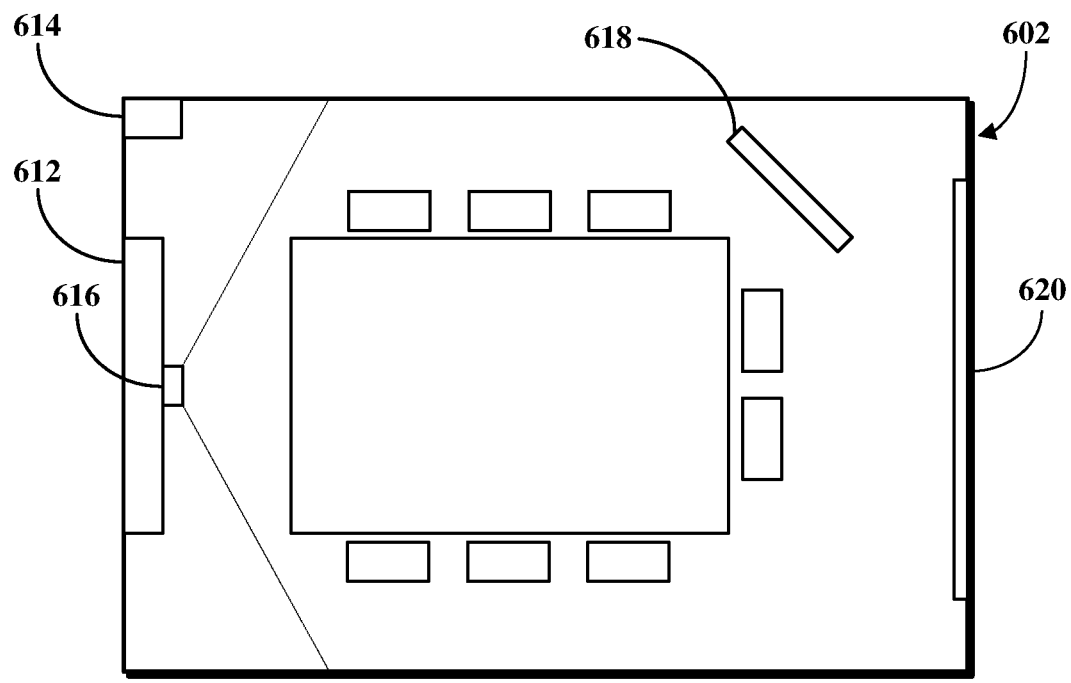

FIGS. 6A-B are illustrations of examples of physical spaces 600 and 602, respectively, within which illumination testing for shared device displays may be performed. Each of the physical spaces 600 and 602 may, for example, be the physical space 402 shown in FIG. 4. Referring first to FIG. 6A, the physical space 600 is shown as including a shared device 604 (e.g., a television mounted on a wall of the physical space 600), a computing device 606 (e.g., a desktop computer in a corner of the physical space 600), and a camera 608 (e.g., mounted below the shared device 604). For example, the shared device 604, the computing device 606, and the camera 608 may respectively be the shared device 408, the computing device 404, and the camera 406 shown in FIG. 4. A conference table and chairs are present within a field of view of the camera 608. The physical space 600 does not include unexpected objects or reflective surfaces. Prior to an illumination test, a test pattern is output to a display of the shared device 604 and a reference image is captured to depict an illumination of the physical space 600 according to the test pattern. To perform the illumination test, the test pattern is again output to the display of the shared device 604, and a test image is captured using the camera 608 while the test pattern is output to the display, in which a field of view of the camera 608 is shown in dotted lines from the camera 608. Software running at the computing device 606 (e.g., illumination testing software, for example, the illumination testing software 500 shown in FIG. 5) processes the test image against the reference image to determine a state of the display. In this example, the test image captures the expected illumination of the physical space according to the test pattern, and so a match (e.g., at least above a threshold) is determined between the test image and the reference image. The state of the display is thus determined to be an operational state.

In some implementations, the physical space 600 may include a camera 610 located somewhere other than at a location of the camera 608. For example, as shown, the camera 610 is mounted on a wall opposite the shared device 604 and the camera 608. The field of view of the camera 610 is shown in dotted lines from the camera 610. In some such implementations, the reference image and the test image may be captured using the camera 610 instead of the camera 608. In some such implementations, the camera 610 may capture an audit image depicting the display of the shared device 604 while the test pattern is output to the display. In some such implementations, the camera 608 may be omitted.

Referring next to FIG. 6B, the physical space 602 is shown as including a shared device 612 (e.g., a television mounted on a wall of the physical space 600), a computing device 614 (e.g., a desktop computer in a corner of the physical space 600), and a camera 616 (e.g., mounted below the shared device 604). For example, the shared device 612, the computing device 614, and the camera 616 may respectively be the shared device 408, the computing device 404, and the camera 406 shown in FIG. 4. A conference table and chairs are present within a field of view of the camera 616. The physical space 602 further includes an object 618 (e.g., a standalone whiteboard) nearby the conference table and a window 620 on a wall opposing the shared device 612 and the camera 616. Prior to an illumination test, a test pattern is output to a display of the shared device 612 and a reference image is captured to depict an illumination of the physical space 602 according to the test pattern. To perform the illumination test, the test pattern is again output to the display of the shared device 612, and a test image is captured using the camera 616 while the test pattern is output to the display. Software running at the computing device 614 (e.g., illumination testing software, for example, the illumination testing software 500) processes the test image against the reference image to determine a state of the display. In this example, the window blinds typically covering the window 620 have been left open prior to the illumination test and the object 618 is within the field of view of the camera 616 (shown in dotted lines). Despite the test pattern being visually perceptible at the display of the shared device 612 (e.g., such that the test pattern is both output to and output at the display), the illumination of the physical space 602 according to the test pattern is distorted by reflections of the test pattern from the window 620 as well as reflections and/or light blocking caused by the presence of the object 618 within the physical space 602. As a result, values of the test image captured by the camera 616 while the test pattern is output to the display may not match co-located values of the reference image. This is because the illumination resulting from the various reflections and light blocking depicted in the test image differs from the expected illumination of the physical space 602 as depicted in the reference image. The state of the display is thus determined to be a fail state.

Figure 7:
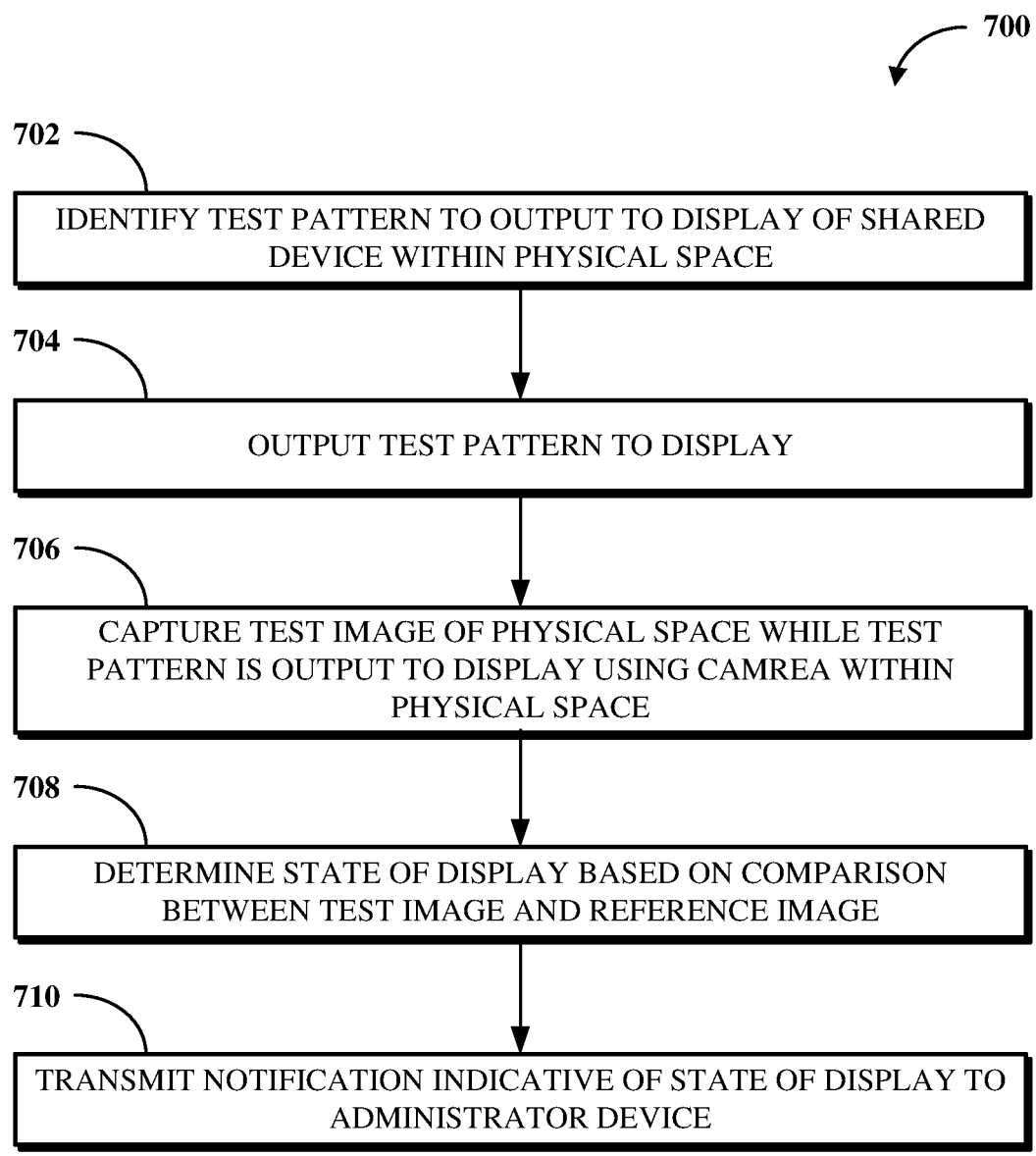
FIG. 7 is a flowchart of an example of a technique for illumination testing for shared device displays.
Figure 8:
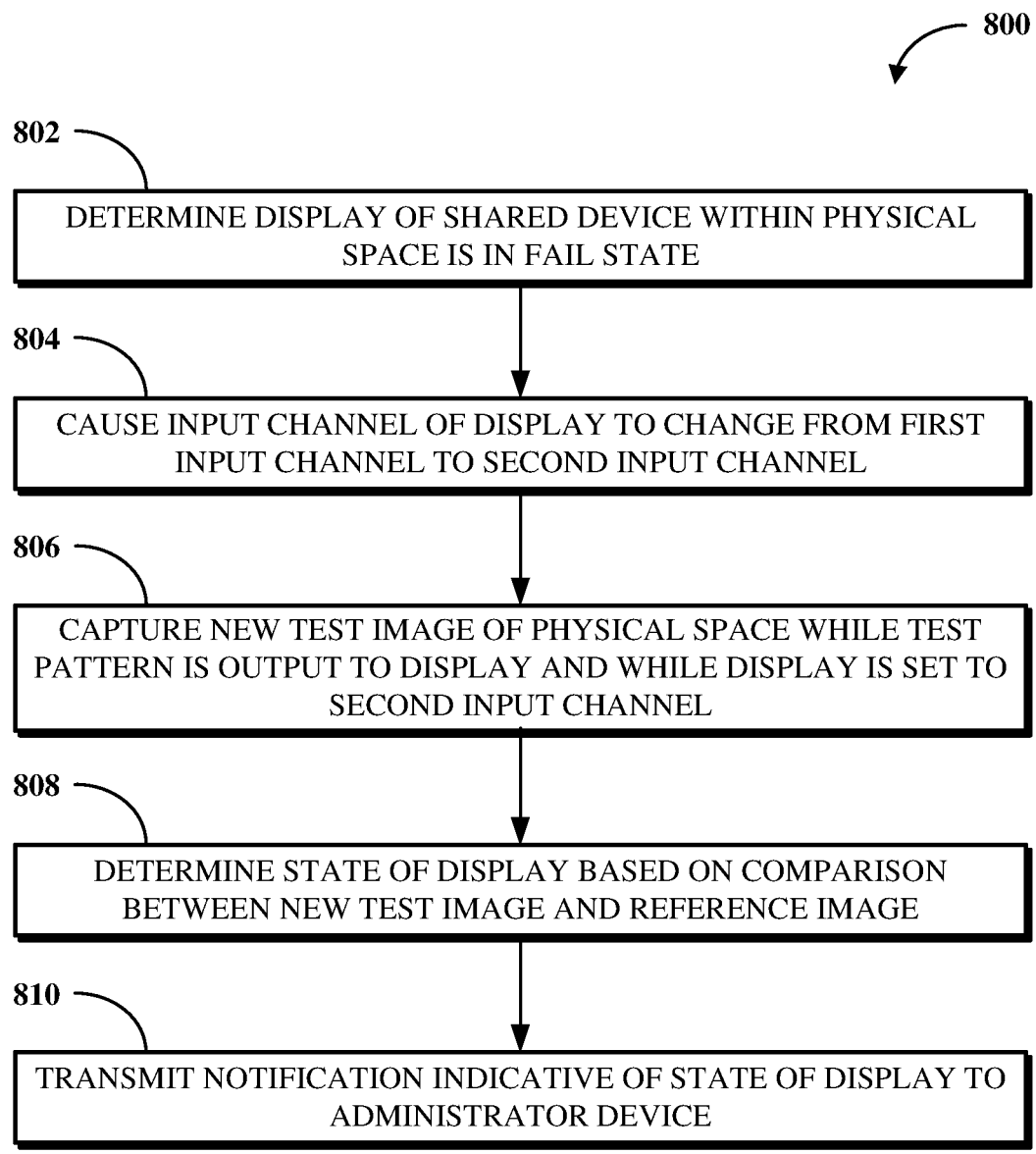
FIG. 8 is a flowchart of an example of a technique for illumination re-testing based on a fail state determination for a shared device display.

To further describe some implementations in greater detail, reference is next made to examples of techniques which may be performed by or using a system for illumination testing for shared device displays. FIG. 7 is a flowchart of an example of a technique 700 for illumination testing for shared device displays. FIG. 8 is a flowchart of an example of a technique 800 for illumination re-testing based on a fail state determination for a shared device display.

The technique 700 and/or the technique 800 can be executed using computing devices, such as the systems, hardware, and software described with respect to FIGS. 1-6B. The technique 700 and/or the technique 800 can be performed, for example, by executing a machine-readable program or other computer-executable instructions, such as routines, instructions, programs, or other code. The steps, or operations, of the technique 700 and/or the technique 800, or another technique, method, process, or algorithm described in connection with the implementations disclosed herein, can be implemented directly in hardware, firmware, software executed by hardware, circuitry, or a combination thereof.

For simplicity of explanation, the technique 700 and/or the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 7, the technique 700 for illumination testing for shared device displays is shown. At 702, a test pattern to output to a display of a shared device within a physical space is identified. The test pattern is selected based on an association with the physical space. For example, the association with the physical space may be based on a prior use of the test pattern for capturing a reference image within the physical space, in which the reference image depicts an expected illumination of the physical space according to the test pattern.

At 704, the test pattern is output to the display. In at least some cases, the outputting of the test pattern to the display may be considered initiate an illumination test for the display. The test pattern may be output based on a schedule. For example, the outputting of the test pattern to the display may be scheduled to occur at a time during which the physical space is unoccupied, such as overnight.

At 706, a test image of the physical space is captured using a camera within the physical space while the test pattern is output to the display. The camera has a field of view including at least a portion of the physical space. The test image is intended to depict how the physical space looks when the test pattern is output to the display, such as based on whether or not the test pattern is output at (i.e., visually perceptible at) the display.

At 708, a state of the display is determined based on a comparison between the test image and a reference image. The state of the display may be a fail state that indicates that the display is incapable of displaying video content of a video conference or an operational state indicates that the display is capable of displaying video content of a video conference. Determining the state of the display includes comparing color values of pixels of the test image with color values of co-located pixel of the reference image to determine a percentage of the pixels of the test image that match their co-located pixels of the reference image. The state may then be determined based on a comparison between that percentage and a threshold. For example, determining that the display is in the fail state can include determining that a difference between the test image and the reference image meets a threshold, such as based on the percentage of pixels of the test image that match their co-located pixels of the reference image.

At 710, a notification indicative of the state of the display is transmitted to an administrator device associated with the physical space. The notification may be transmitted immediately upon the determination of the state or at a scheduled time. In some cases, notifications may only be transmitted for fail states. In some implementations, a notification indicative of the state of the display may also be transmitted to one or more other devices, for example, a device associated with a person who according to reservation data is to next use the physical space. For example, the notification to the one or more other devices may alert those device users as to the limited video functionality of the physical space where the state of the display is a fail state.

In some implementations, where the determined state of the display is a fail state, the technique 700 may includes performing one or more actions to determine a cause of the fail state. In some such implementations, the notification transmitted to the administrator device indicates the cause of the fail state.

In some implementations, the test pattern includes a sequence of images and the test image is an image of a sequence of test images captured using the camera while the sequence of images is sequentially output to the display. In some such implementations, determining the state of the display can include determining whether at least one image of the sequence of test images does not match a corresponding reference image of a sequence of reference images depicting expected illuminations of the physical space according to the test pattern. For example, a fail state of the display may be determined based on a determination determining that at least one image of the sequence of test images does not match a corresponding reference image of a sequence of reference images depicting expected illuminations of the physical space according to the test pattern.

Referring next to FIG. 8, the technique 800 for illumination re-testing based on a fail state determination for a shared device display is shown. At 802, a display of a shared device within a physical space is determined to be in a fail state. The display is determined to be in a fail state during an illumination test performed for the display. For example, the display may be determined to be in a fail state as described above with respect to the technique 700 of FIG. 7.

At 804, an input channel of the display is caused to change from a first input channel to a second input channel. The input channel is changed based on the determination that the display is in the fail state. For example, the display may have been set to the first input channel while the illumination test resulting in the determined fail state was performed. The input channel of the display may thus be changed from that first input channel to a second input channel. For example, each input channel may correspond to a different set of video input capabilities for the shared device that includes the display, such as one or more HDMI channels, one or more component channels, one or more composite channels, one or more RCA connectors, one or more video graphics arrays connectors, one or more wireless signal protocols usable with the shared device (e.g., Wi-Fi and Bluetooth), and one more universal serial bus (USB) connectors.

At 806, a new test image of the physical space is captured using a camera within the physical space while the test pattern is output to the display and while the display is set to the second input channel. The new test image is captured using the same camera as was used during the illumination test to capture the test image for that illumination test.

At 808, a state of the display is determined based on a comparison between the new test image and the reference image used for the initial illumination test. The comparison between the new test image and the reference image, and thus the determination of the state of the display, may be performed as described above with respect to the technique 700.

At 810, a notification indicative of the state of the display according to the illumination re-test is transmitted to an administrator device associated with the physical space. For example, where the state of the display according to the illumination re-test (i.e., resulting from changing the input channel of the display from the first input channel to the second input channel) is an operational state, the notification may indicate the previous determination of the fail state as well as the resolution of the fail state based on the input channel change.

The implementations of this disclosure correspond to methods, non-transitory computer readable media, apparatuses, systems, devices, and the like. In some implementations, a method comprises outputting a test pattern to a display within a physical space; capturing, using a camera within the physical space, a test image of the physical space while the test pattern is output to the display; determining that the display is in a fail state by comparing the test image against a reference image depicting an expected illumination of the physical space according to the test pattern; and transmitting a notification indicating the fail state to an administrator device. In some implementations, a non-transitory computer readable medium stores instructions operable to cause one or more processors to perform operations comprising outputting a test pattern to a display within a physical space; capturing, using a camera within the physical space, a test image of the physical space while the test pattern is output to the display; determining that the display is in a fail state by comparing the test image against a reference image depicting an expected illumination of the physical space according to the test pattern; and transmitting a notification indicating the fail state to an administrator device. In some implementations, an apparatus comprises a memory and a processor configured to execute instructions stored in the memory to output a test pattern to a display within a physical space; capture, using a camera within the physical space, a test image of the physical space while the test pattern is output to the display; determine that the display is in a fail state by comparing the test image against a reference image depicting an expected illumination of the physical space according to the test pattern; and transmit a notification indicating the fail state to an administrator device.

In some implementations of the method, non-transitory computer readable medium, or apparatus, the test image is captured while the display is set to a first input channel, and the method comprises, the operations comprise, or the processor is configured to execute the instructions to, based on the determination that the display is in the fail state: causing an input channel of the display to change from the first input channel to a second input channel; capturing, using the camera, a second test image while the test pattern is output to the display and while the display is set to the second input channel; and determining that the display is in an operational state by comparing the second test image against the reference image, wherein the notification indicates a resolution of the fail state.

In some implementations of the method, non-transitory computer readable medium, or apparatus, the method comprises, the operations comprise, or the processor is configured to execute the instructions for performing one or more actions to determine a cause of the fail state, wherein the notification indicates the cause of the fail state.

In some implementations of the method, non-transitory computer readable medium, or apparatus, the test pattern includes a sequence of images and the test image is an image of a sequence of test images captured using the camera while the sequence of images is sequentially output to the display, and determining that the display is in the fail state comprises determining that at least one image of the sequence of test images does not match a corresponding reference image of a sequence of reference images depicting expected illuminations of the physical space according to the test pattern.

In some implementations of the method, non-transitory computer readable medium, or apparatus, determining that the display is in the fail state comprises determining that a difference between the test image and the reference image meets a threshold.

In some implementations of the method, non-transitory computer readable medium, or apparatus, the method comprises, the operations comprise, or the processor is configured to execute the instructions for capturing, using a second camera having a field of view including the display, an audit image while the test pattern is output to the display; and processing the audit image to determine whether the test pattern is output at the display when the test image is captured.

In some implementations of the method, non-transitory computer readable medium, or apparatus, the method comprises, the operations comprise, or the processor is configured to execute the instructions for scheduling the outputting of the test pattern to the display to occur at a time during which the physical space is unoccupied.

In some implementations of the method, non-transitory computer readable medium, or apparatus, the fail state indicates that the display is incapable of displaying video content of a video conference.

In some implementations of the method, non-transitory computer readable medium, or apparatus, the test image is captured while the display is set to a first input channel, and determining that the display is in a fail state comprises determining that other images captured, using the camera, while the test pattern is output to the display and while the display is set to input channels other than the first input channel do not match the reference image.

In some implementations of the method, non-transitory computer readable medium, or apparatus, the method comprises, the operations comprise, or the processor is configured to execute the instructions for transmitting a second notification indicating the fail state to a host of a video conference scheduled to use the physical space.

In some implementations of the method, non-transitory computer readable medium, or apparatus, the method comprises, the operations comprise, or the processor is configured to execute the instructions for one or more of: determining whether the display is powered on; determining whether a computing device using the display is communicating with a server causing the outputting of the test pattern; or determining whether the display is set to a correct input channel.

In some implementations of the method, non-transitory computer readable medium, or apparatus, the camera is located directly across the physical space from the display.

In some implementations of the method, non-transitory computer readable medium, or apparatus, the test pattern is output to the display to cause the display to illuminate the physical space according to the test pattern.

In some implementations of the method, non-transitory computer readable medium, or apparatus, the test image is captured while the display is set to a first input channel, and the method comprises, the operations comprise, or the processor is configured to execute the instructions for capturing, using the camera, a second test image while the test pattern is output to the display and while the display is set to a second input channel; and determining that the display is in an operational state by comparing the second test image against the reference image.

In some implementations of the method, non-transitory computer readable medium, or apparatus, the display is in the fail state where differences between the test image and the reference image meet a threshold.

In some implementations of the method, non-transitory computer readable medium, or apparatus, the method comprises, the operations comprise, or the processor is configured to execute the instructions for determining, based on the test image, that an object is in a wrong location within the physical space; and indicating the wrong location of the object within the notification.

In some implementations of the method, non-transitory computer readable medium, or apparatus, the method comprises, the operations comprise, or the processor is configured to execute the instructions for transmitting a second notification indicating the fail state to a host device associated with a video conference scheduled to use the physical space; and receiving a response to the second notification from the host device indicating to cancel a reservation for the physical space associated with the video conference.

In some implementations of the method, non-transitory computer readable medium, or apparatus, the test pattern is generated specifically for the physical space.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    causing, based on a fail state of a display within a physical space, the display to change from a first input channel to a second input channel, wherein the fail state indicates that a test pattern output to the display via the second input channel is not output at the display while the display is on the first input channel;
    capturing, using a camera within the physical space, a test image of the physical space while the test pattern remains output to the display via the second input channel and while the display is on the second input channel;
    determining that the display is in an operational state by comparing the test image against a reference image depicting an expected illumination of the physical space according to the test pattern; and
    transmitting a notification indicating the operational state to an administrator device.

2. The method of claim 1, comprising:
    determining that the display is in the fail state by comparing a previous test image of the physical space against the reference image.

3. The method of claim 1, comprising:
    determining that the display is in the fail state while the display is on the first input channel.

4. The method of claim 1, wherein the first input channel corresponds to a first set of video input capabilities for the display and the second input channel corresponds to a second set of video input capabilities for the display.

5. The method of claim 1, wherein transmitting the notification indicating the operational state to the administrator device comprises:
    indicating, within the notification, a previous determination of the fail state and a resolution of the fail state based on the change to the second input channel.

6. The method of claim 1, comprising:
    selecting the test pattern based on an association with the physical space.

7. The method of claim 1, comprising:

scheduling the outputting of the test pattern to the display for a time during which the physical space is unoccupied.

8. The method of claim 1, wherein determining that the display is in the operational state comprises:
comparing pixels of the test image with co-located pixels of the reference image to determine a percentage of the pixels of the test image that match respective ones of the co-located pixels of the reference image.

9. The method of claim 1, wherein the notification includes one or more audit images depicting the display.

10. The method of claim 1, wherein the physical space is a conference room and the display is a shared device display configured for use with video conferencing.

11. A non-transitory computer readable medium storing instructions operable to cause one or more processors to perform operations comprising:
causing, based on a fail state of a display within a physical space, the display to change from a first input channel to a second input channel, wherein the fail state indicates that a test pattern output to the display via the second input channel is not output at the display while the display is on the first input channel;
capturing, using a camera within the physical space, a test image of the physical space while the test pattern remains output to the display via the second input channel and while the display is on the second input channel;
determining that the display is in an operational state by comparing the test image against a reference image depicting an expected illumination of the physical space according to the test pattern; and
transmitting a notification indicating the operational state to an administrator device.

12. The non-transitory computer readable medium of claim 11, wherein the display is on the first input channel when the fail state is determined.

13. The non-transitory computer readable medium of claim 11, wherein the notification indicates the fail state and the operational state.

14. The non-transitory computer readable medium of claim 11, wherein the fail state indicates that the display is incapable of video content display and the operational state indicates that the display is capable of video content display.

15. A system, comprising:
one or more memories; and
one or more processors configured to execute instructions stored in the one or more memories to:
cause, based on a fail state of a display within a physical space, the display to change from a first input channel to a second input channel, wherein the fail state indicates that a test pattern output to the display via the second input channel is not output at the display while the display is on the first input channel;
capture, using a camera within the physical space, a test image of the physical space while the test pattern remains output to the display via the second input channel and while the display is on the second input channel;
determine that the display is in an operational state by comparing the test image against a reference image depicting an expected illumination of the physical space according to the test pattern; and
transmit a notification indicating the operational state to an administrator device.

16. The system of claim 15, wherein, to determine that the display is in the operational state, the one or more processors are configured to execute the instructions to:
determine that a difference between the test image and the reference image meets a threshold.

17. The system of claim 15, wherein the fail state is based on a comparison between a previous test image of the physical space, captured using the camera, against the reference image.

18. The system of claim 15, wherein the test pattern is selected based on the physical space.

19. The system of claim 15, wherein the test pattern is generated for use with the physical space.

20. The system of claim 15, wherein the display is within a field of view of the camera.

* * * * *